UNITED STATES PATENT OFFICE.

FABRICIUS COBELLIS, OF PHILADELPHIA, PENNSYLVANIA.

MANUFACTURE OF SYNTHETIC CARBOLIC ACID.

1,301,909.     Specification of Letters Patent.     Patented Apr. 29, 1919.

No Drawing.     Application filed February 9, 1917. Serial No. 147,545.

*To all whom it may concern:*

Be it known that I, FABRICIUS COBELLIS, a subject of the King of Italy, and a resident of Philadelphia, in the county of Philadelphia and State of Pennsylvania, have invented certain new and useful Improvements in the Manufacture of Synthetic Carbolic Acid, whereof the following is a specification.

More specifically my invention relates to a process for the manufacture of synthetic carbolic acid, in connection with which lithopone is obtained as a by-product.

Heretofore synthetic carbolic acid has been manufactured by sulfonating benzol with concentrated sulfuric acid, in order to obtain benzene-sulfonic acid. The mixture of sulfuric and benzene-sulfonic acids is then poured into water and neutralized with calcium or barium hydroxid with production of calcium or barium benzene-sulfonate and the corresponding sulfate. The benzene-sulfonic salt is soluble, the sulfate is insoluble, so by simple filtration they are separated and carbolic acid is then produced by treating the benzene-sulfonate in the well known manner. In this process all of the sulfuric acid is lost, being taken up in the production of calcium or barium sulfate, which are practically valueless.

According to my invention, instead of using a calcium or barium salt, I employ a zinc compound, to neutralize the mixture of sulfuric and benzene-sulfonic acid, and thereby obtain a solution of zinc sulfate and zinc benzene-sulfonate, which when acted upon by barium sulfid gives both barium benzene-sulfonate (from which carbolic acid is obtained), and also barium sulfate and zinc sulfid (which constitute the raw materials for the production of lithopone, which is a valuable product).

In carrying out my process I neutralize the aqueous solution of benzene-sulfonic acid and sulfuric acid with say zinc oxid (or some other suitable zinc compound). I thereby produce a solution of zinc sulfate and zinc benzene-sulfonate. By mixing this with the calculated quantity of barium sulfid I obtain a precipitate which consists of zinc sulfid and barium sulfate, leaving in solution the barium benzene-sulfonate.

The reactions take place according to the following formulæ:—

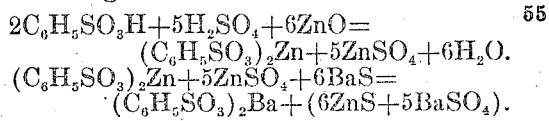

$$2C_6H_5SO_3H + 5H_2SO_4 + 6ZnO =$$
$$(C_6H_5SO_3)_2Zn + 5ZnSO_4 + 6H_2O.$$
$$(C_6H_5SO_3)_2Zn + 5ZnSO_4 + 6BaS =$$
$$(C_6H_5SO_3)_2Ba + (6ZnS + 5BaSO_4).$$

The solid precipitate being a mixture of zinc sulfid and barium sulfate, is treated in the well known way for the production of commercial lithopone, a valuable and useful material in the manufacture of paints.

Carbolic acid is manufactured from barium benzene-sulfonate in a well known way, by precipitating the barium with sodium sulfate or sodium carbonate, in order to produce sodium-benzene-sulfonate, which is evaporated to dryness and mixed with caustic soda, producing a solid mass which is then fused to 300 degrees C., and when the re-action is complete, neutralized with acid in order to free the carbolic acid which is distilled *in vacuo* or with steam and allowed to crystallize.

The same method may be applied to the manufacture of resorcinol, naphthol, xylol and other homologous products, where sulfonic acid is used for sulfonation, or whenever it is desired to introduce an OH group of a phenolic character into an aromatic hydrocarbon.

Having thus described my invention, I claim:

1. The process of manufacturing phenol or its derivatives, and also barium sulfate and zinc sulfid, which consists in neutralizing sulfuric acid solution and benzene sulfonic acid with a zinc compound, with production of the corresponding zinc sulfate, and zinc sulfonate, adding thereto barium sulfid, whereby barium sulfate and zinc sulfid are precipitated, leaving barium benzene sulfonate, and producing the desired phenol derivative therefrom.

2. The process of manufacturing synthetic carbolic acid and lithopone, which consists in neutralizing a solution of benzene-sulfonic acid and sulfuric acid with a zinc compound, with production of zinc sulfate and zinc benzene-sulfonate, adding thereto barium sulfid, whereby the component parts of lithopone are precipitated, leaving barium benzene-sulfonate in solution, and producing synthetic carbolic acid therefrom.

In testimony whereof, I have hereunto signed my name, at Philadelphia, Pennsylvania, this fifth day of February, 1917.

FABRICIUS COBELLIS.

Witnesses:
 JAMES H. BELL,
 E. L. FULLERTON.